United States Patent
Amulu et al.

(10) Patent No.: US 12,197,941 B2
(45) Date of Patent: Jan. 14, 2025

(54) FRAMEWORK FOR SCHEDULING DEPENDENT COMPUTER TRANSACTIONS

(71) Applicant: SAP SE, Walldorf (DE)

(72) Inventors: James Michael Amulu, Chennai (IN); Ranganathan Natarajan, Bangalore (IN)

(73) Assignee: SAP SE, Walldorf (DE)

( * ) Notice: Subject to any disclaimer, the term of this patent is extended or adjusted under 35 U.S.C. 154(b) by 445 days.

(21) Appl. No.: 17/688,168

(22) Filed: Mar. 7, 2022

(65) Prior Publication Data

US 2023/0281034 A1 Sep. 7, 2023

(51) Int. Cl.
| | |
|---|---|
| *G06F 3/00* | (2006.01) |
| *G06F 9/46* | (2006.01) |
| *G06F 9/48* | (2006.01) |
| *G06F 18/214* | (2023.01) |
| *G06N 20/00* | (2019.01) |

(52) U.S. Cl.
CPC ............ *G06F 9/466* (2013.01); *G06F 9/4881* (2013.01); *G06F 18/214* (2023.01); *G06N 20/00* (2019.01)

(58) Field of Classification Search
CPC ....................................................... G06F 9/48
See application file for complete search history.

(56) References Cited

U.S. PATENT DOCUMENTS

| | | | |
|---|---|---|---|
| 2008/0120153 A1* | 5/2008 | Nonemacher | ............. G06F 8/10 705/7.11 |
| 2016/0294856 A1* | 10/2016 | Boia | ................... H04L 63/1425 |
| 2019/0180443 A1* | 6/2019 | Xue | ........................ G06T 7/13 |
| 2020/0312011 A1* | 10/2020 | Kopeinigg | ............ G06T 19/006 |
| 2021/0133683 A1* | 5/2021 | Zhang | ...................... G06N 7/01 |

OTHER PUBLICATIONS

Luciano Baresi, Live Migration Ate My VM: Recovering a Virtual Machine after Failure of Post-Copy Live Migration. (Year: 2019).*

* cited by examiner

*Primary Examiner* — Lechi Truong
(74) *Attorney, Agent, or Firm* — SCHWEGMAN LUNDBERG & WOESSNER, P.A.

(57) ABSTRACT

In an example embodiment, a framework is provided that helps configure predefined actions on transactions in a process flow, which will be continuously learned using artificial intelligence (AI)/machine learning techniques. This allows decision trees to be dynamically built to bypass unnecessary delays, especially as the volume of inputs grows and the variations of decisions become more complex.

14 Claims, 4 Drawing Sheets

FRAMEWORK FOR SCHEDULING DEPENDENT COMPUTER TRANSACTIONS

BACKGROUND

In an enterprise application development environment, there are process flows that are identified, which are catered through a set of transactions performed by individuals based on triggers, such as workflows or tasks.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In an enterprise application development environment, the process flows used may contain transactions that are either mundane in nature or a set of predefined actions. Such transactions, while often trivial or semi-automatic, can bottleneck the overall process flows by adding unnecessary delay.

In an example embodiment, a framework is provided that helps configure predefined actions on transactions in a process flow, which will be continuously learned using artificial intelligence (AI)/machine learning techniques. This allows decision trees to be dynamically built to bypass unnecessary delays, especially as the volume of inputs grows and the variations of decisions become more complex.

More particularly, the framework allows for the definition of multiple different process flows and predefined decision making criteria, as well as scenarios that take into account historical decision data to learn values for the value. The framework also is able to progressively build a decision tree to achieve human-like decisions without needing the input of actual humans (thus avoiding delays in the process flows caused by human delay). The result is that transactions involved in process flows are automated individually, so there are no transactions that are held or delayed for want of human intervention.

The framework, once defined and deployed, provides a hook-like execution on data, runs the machine learned algorithms, and suggests/implements the best possible decisions to move the process flow with or without human interventions. A set of predefined templates can be provided, which the end user can customize to improve the decision-making process. The framework also provides mapping of source systems where it is deployed and a set of microservices to leverage in case the user wants to use a specific set of microservices.

In an unsupervised implementation, each transaction is performed until the required accuracy levels are reached, with an alert sent to a human decision maker responsible for the transaction to help understand the automatic decisions taken. This allows the human decision maker to override the AI decisions, if need be.

Through continuous learning, the decision trees get updated to improve the quality of decision-making for the set of process flows when new transactions are performed.

A process flow is a sequence of steps to be performed to accomplish some goal using a computer system. Process flows are also known as "business processes," although there is nothing inherently business-related about the business processes and generally the term can be used whether or not the underlying process is business-related or even performed by a business. Business process application software allows for the definition and execution of business processes in a computer system. Examples of business processes include updating customer information, receiving and fulfilling orders, synchronizing customer information stored on multiple computer systems, and generating a price quote. Business processes are often associated with data descriptions and transformation rules for accessing individual data items, such as a customer name or a unit price.

A business process specifies a sequence of activities to be performed in a specified order and may specify conditional and repeated execution of activities. Business process application software can execute a business process, prompting for or retrieving input data as needed, and produce results or effects, such as output data or execution of database transactions.

A business process application configuration includes a set of business processes and associated data, including data descriptions and transformation descriptions, which specify how to execute one or more particular business processes using general-purpose business process application software. The configuration information is typically represented as data stored in disk files or in an online repository, depending on the particular business process application software.

The business process software can load the configuration information, including the business process, and subsequently execute the business processes. For example, a shipping company may have a business process application configuration consisting of a computer system running software with a ShipmentReceived business process, which is to be executed when a shipping container arrives at a transit hub. The ShipmentReceived business process updates an inventory database of shipping container locations and invokes another computer system to route the shipping container to its destination. The shipping company may have a second business process application configuration consisting of another computer system running software with a ConfirmOrder business process, which is to be executed when an order has been processed. The ConfirmOrder business process, which is invoked by an order processing system, retrieves the customer's e-mail address and sends an e-mail notice to the customer describing the order.

Other examples of business processes include production planning, procurement planning, hire-to-retire, dynamic cash flow, available-to-process, and material requirement planning. An example in the human resources context involves a job posting open in a portal. A resume that is uploaded for the published post triggers various actions, including resume matching with the job description, resume matching based on predefined criteria, interview matching based on available interviewers, interview scheduling based on candidate and interviewer schedules, interview execution, result capture (based on accept/reject criteria), job position closing transactions, and onboarding process triggers such as issuance of offer.

Figure 1:
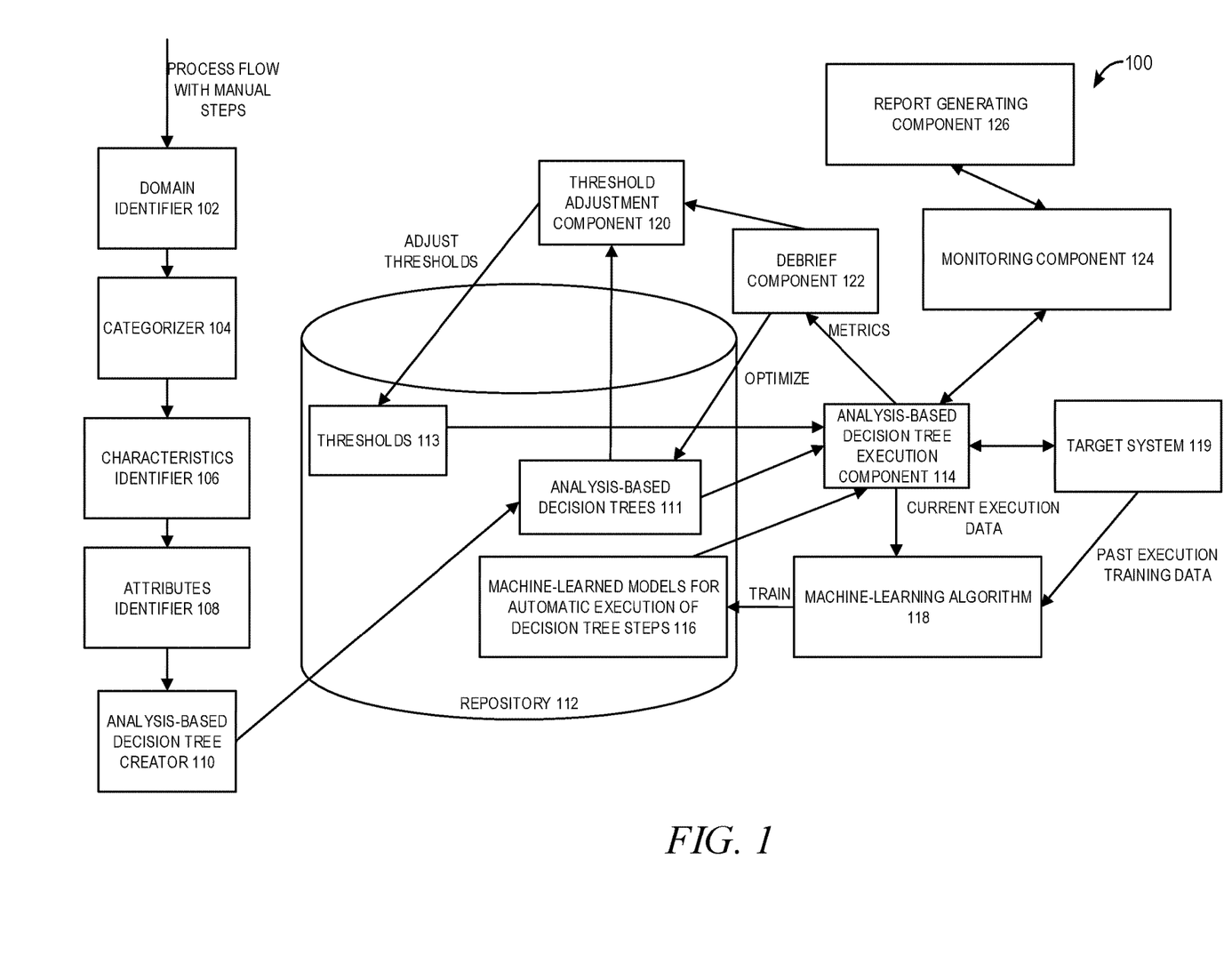
FIG. 1 is a block diagram illustrating a system for training and using machine-learned models for automatic execution of decision tree steps, in accordance with an example embodiment.

FIG. 1 is a block diagram illustrating a system 100 for training and using machine-learned models for automatic execution of decision tree steps, in accordance with an example embodiment. A process flow having manual steps is passed to a domain identifier 102. The domain identifier 102 identifies a domain for the process flow. The domain describes the general organizational context of the process flow. This may be performed when a new transaction flow is created using a user-defined domain. Examples include human resources, supply chain management, and supplier relationship management. In an example embodiment, an identification of the domain for a process flow may be stored in the data structure in which the process flow is maintained, and thus identification of the domain may involve retrieving this identification from the data structure. In another example embodiment, the domain for a process flow may need to be inferred, such as by using a set of predefined rules or machine learning to learn types of steps that are commonly used in certain domains. For example, the scheduling of an interview will likely be a step in the human resources domain rather than the supply chain management domain, and thus the presence of such a step in a business process may infer that the business process pertains to the human resources domain.

The process flow may then be passed through a categorizer 104. The categorizer 104 chooses a category for the process flow based on the identified domain of the process flow. Specifically, based on the domain selection, the categories may be populated/provided from integration services software. Example categories for a human resources domain include campus selection, smart hiring, retiring, and so forth.

The process flow may then be passed through a characteristics identifier 106. The characteristics identifier 106 identifies one or more characteristics of the process flow, based on the identified domain and the chosen category of the process flow. Example characteristics for a smart hiring category include resume shortlist, interviewer selection, mode of interview, and so forth.

The process flow may then be passed through an attributes identifier 108. The attributes identifier 108 identifies one or more attributes of the process flow, based on the identified characteristics. For each category of a service, options such as create, write, update & delete (CRUD) operations or user provided code snippets can be modeled by a user. There are cases where additional inputs, parameters, and values can be provided. Additionally, events, if any, to trigger or override parameter values can be defined using attributes. Example attributes include requirement, role definition, and so forth.

An analysis based decision tree creator 110 then creates an analysis-based decision tree 111 for the process flow. This involves identifying any of the process flow steps that are performed by a human and can be automated. Each such automatable process flow step may then be defined as including at least one test with one or more thresholds 113.

The test involves performing an action that tests whether the corresponding process step can be fired automatically (i.e., without human intervention), and the one or more thresholds define when that trigger fires. For example, if the process step involves evaluating a resume to determine if the candidate has the necessary background for a role, the test may involve a machine-based comparison of the resume to the job listing and outputting a matching score indicative of how closely they match. The one or more thresholds may then include a threshold indicating how long the system will wait to allow a human to perform the step before firing a trigger to execute a machine-learned model to perform the step. Notably, while the test is described in the analysis-based decision tree 111, the actual functioning of how the test is performed may not be, as that information will be obtained later from a machine-learned model, as will be described in more detail below.

The analysis-based decision tree 111 can then be stored in repository 112.

At runtime, when the process flow is to be executed, an analysis-based decision tree execution component 114 executes the analysis-based decision tree 111. This includes obtaining any machine-learned models for automatic execution of decision tree steps 116 that apply to the analysis-based decision tree 111. This is determined by identifying any tests identified in the analysis-based decision tree 111 and retrieving the machine-learned models for automatic execution of decision tree steps 116 that correspond to those tests.

Each of the machine-learned models for automatic execution of decision tree steps 116 may be learned via a machine-learning algorithm 118, which may obtain past execution training data from a target system 1219. The target system 119 may be a system on which the results of the analysis-based decision tree execution component 114 are used, such as a human resources software component or supply chain management software component. The past execution training data is data about past executions of steps of the process flow, such as the substeps performed by users to perform each step and the ordering of the substeps. The machine-learning algorithm 118 may take this past execution training data and use it to train the machine-learned models for automatic execution of decision tree steps 116. For example, the machine-learning algorithm 118 may recognize that determining whether to extend an interview to a job candidate involved a series of various comparisons of various pieces of information in a candidate's resume (and other inputted information about the candidate) with various pieces of information about a job opening (such as those listed in a job listing, or "hidden" qualifications known to the employer but not expressly listed in the job listing).

The machine-learning algorithm 118 may iterate among various parameters, changing parameters (weights) multiplied by various input variables and evaluating a loss function at each iteration, until the loss function is minimized, at which stage the parameters for that stage are learned. The past execution training data may include manually labeled data. Specifically, the weights are multiplied by the input variables as part of a weighted sum operation, and the weighted sum operation is used by the loss function.

The machine-learning algorithm 118 may also be selected from among many other different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

The machine-learned models for automatic execution of decision tree steps 116 can also be retrained each time an execution of the analysis-based decision tree execution component 114 is performed, which feeds current execution training data into the machine-learning algorithm 118. This allows the machine-learned models for automatic execution of decision tree steps 116 to be continuously updated to reflect current changes in process flow. For example, if prior executions of a particular process flow included performing substeps A, B, C, and D in that order to perform step 4, and then humans are either performing or overriding automatically performed substeps so that substep C is not being performed by these subsequent executions, then the machine-learning algorithm 118 retrains the corresponding machine-learned model to eliminate substep C.

The use of the machine-learned models for automatic execution of decision tree steps 116 in the analysis-based decision tree execution component 114 may include comparing values computed through execution of the models to the thresholds 113. Thus, as described earlier, if a machine-learned model for automatic execution of a decision tree step involves comparing terms in a candidate's resume to terms in a job description and computing a matching score indicative of how similar the candidate's resume is to the job description, the matching score may then be compared to a threshold to determine whether a match has actually occurred and the next step in the analysis-based decision tree should be fired (such as scheduling an interview). Thresholds used to determine a score may be termed an evaluation-based threshold.

Another type of threshold is a temporal threshold, which describes limits on the time taken to perform a certain step. For example, a threshold may be set such that a human is given a certain amount of time to perform the step before the analysis-based decision tree execution component 114 takes over and performs the step automatically.

Notably, these thresholds 113 are not fixed, but instead may themselves be adjusted by a threshold adjustment component 120, which takes information from a debrief component 122 about various metrics reported by the analysis-based decision tree execution component 114. These metrics may include, for example, the amount of time a user is actually taking to perform the steps. For example, a temporal threshold of one day may be initially set for automatically determining whether o to extend an interview to a job candidate based on a comparison of the candidate's resume to a job description. The metrics from the analysis-based decision tree execution component 114, however, may determine that most (e.g., 90%) of users complete this step in 4 hours. In that case, the threshold adjustment component 120 may adjust this temporal threshold from 1 day to 4 hours. The same can be true when a temporal threshold is raised, such that if it is determined that at some point later fewer than 90% of users are able to complete the step in 4 hours, the threshold may be raised to 5 hours.

A monitoring component 124 may then monitor execution of the analysis-based decision tree execution component 114 and report results of the execution in reports generated by a report generating component 126.

Figure 2:
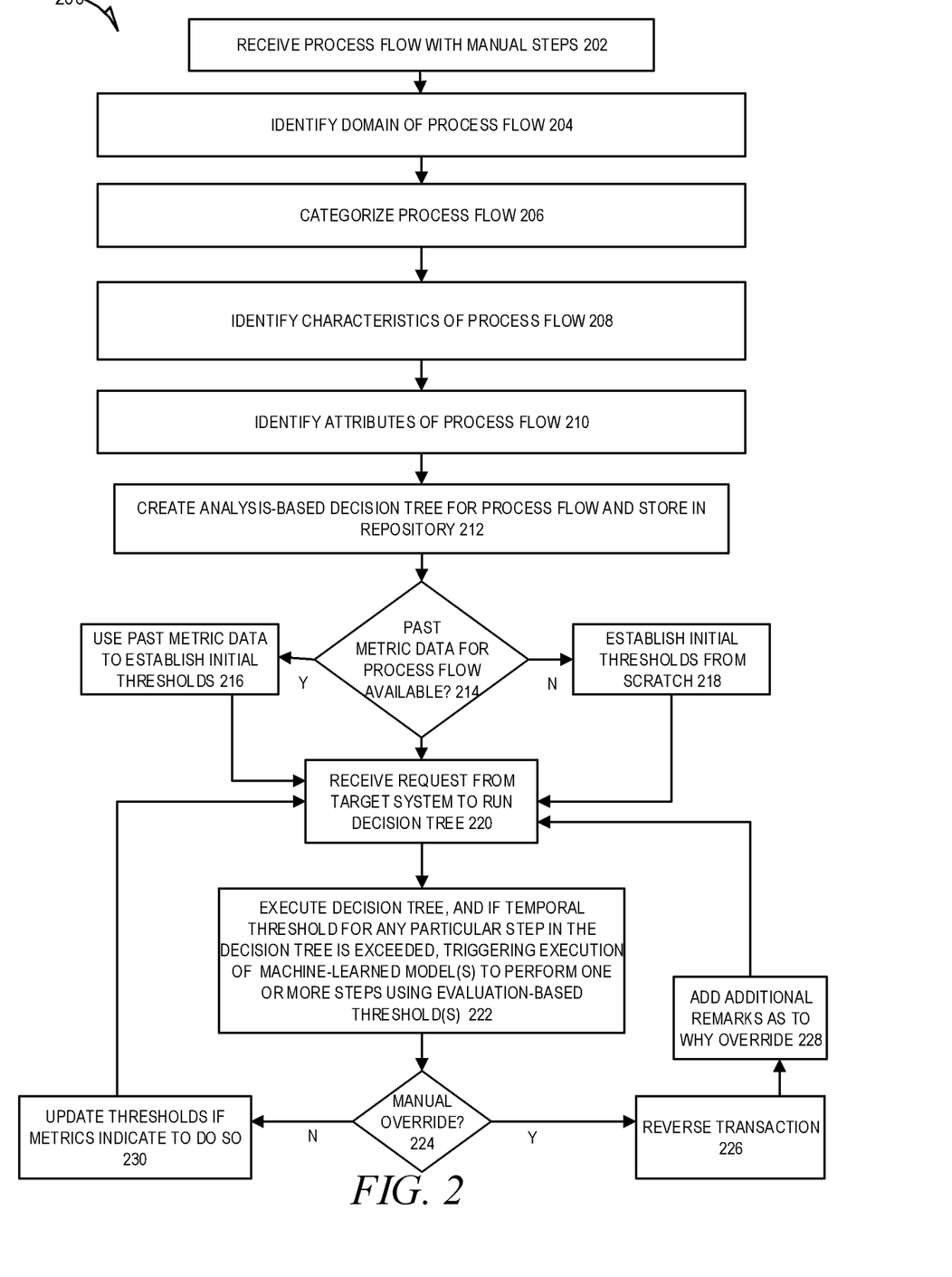
FIG. 2 is a flow diagram illustrating a method for using one or more trained machine-learned models, in accordance with an example embodiment.

FIG. 2 is a flow diagram illustrating a method 200 for using one or more trained machine-learned models, in accordance with an example embodiment. At operation 202, a process flow with manual steps is retrieved. At operation 204, a domain of the process flow is accessed. At operation 206, the process flow is categorized. At operation 208, characteristics of the process flow are identified. At operation 210, attributes of the process flow are identified. At operation 212, an analysis-based decision tree is created for the process flow, and the analysis-based decision tree is stored in a repository.

At operation 214, it is determined if past metric data for the process flow is available. If so, then at operation 216, the past metric data is used to establish initial thresholds. For temporal thresholds, this may include using a length of time by which at least some specific percentage (e.g., 90%) of prior users have completed a step. If it is determined that no past metric data for the process flow is available, then at operation 218, initial thresholds may be established from scratch (such as by setting a default threshold).

At operation 220, a request from a target system to run a decision tree is received. At operation 222, the decision tree is executed and, if a temporal threshold for any particular step in the decision tree is exceeded, execution of one or more machine-learned models to perform one or more steps using evaluation-based thresholds are used.

At operation 224, it is determined if a manual override has been performed. This would involve a human overriding the results of the machine-learned model. If so, then at operation 226 the transaction being performed by the process flow step is reversed and at operation 228 additional remarks as to why there was an override are added.

If there was no manual override, then at operation 230 the thresholds are updated if metrics about the execution so indicate. After either operation 226 or operation 230, the method 200 may repeat back to operation 220, to receive another request to run a decision tree.

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application:

Example 1. A system comprising:
at least one hardware processor; and
a computer-readable medium storing instructions that, when executed by the at least one hardware processor, cause the at least one hardware processor to perform operations comprising:
accessing a process flow having a manual step;
accessing a machine-learned model for automatically performing the manual step;
establishing a temporal threshold for the manual step;
executing the process flow using the temporal threshold, such that the execution of the process flow waits for a time period equal to the temporal threshold and, if it is determined that the manual step has not been completed yet, triggers a machine-learned model to automatically perform the manual step; and
modifying the temporal threshold based on metrics gathered during the execution of the process flow.

Example 2. The system of Example 1, wherein the modifying the temporal threshold includes lowering the temporal threshold to a lowered threshold if at least a predefined percentage of completions of the manual step are performed in a time period equal to the lowered threshold.

Example 3. The system of Examples 1 or 2, wherein the modifying the temporal threshold include raising the temporal threshold to a higher threshold if at least a predefined percentage of completions of the manual step are not performed in a time period equal to the lowered threshold.

Example 4. The system of any of Examples 1-3, wherein the machine-learned model is trained by passing past execution training data from a target system receiving results of the execution of the process flow into a machine-learning algorithm.

Example 5. The system of Example 4, wherein the machine-learning algorithm performs a weighted sum operation by weights by values for input variables in the past execution training data and compares the result of the weighted sum operation for each piece of past execution training data to a label for the piece of past execution training data.

Example 6. The system of Example 5, wherein the weighted sum is utilized in a loss function that the machine-learning algorithm determines if minimized and, if not, iterates the weighted sum operation using altered weights, until the loss function is minimized.

Example 7. The system of Example 4, wherein the machine-learned model is retrained by passing current execution data from the executing to the machine-learning algorithm.

Example 8. A method comprising:
accessing a process flow having a manual step;
accessing a machine-learned model for automatically performing the manual step;
establishing a temporal threshold for the manual step;
executing the process flow using the temporal threshold, such that the execution of the process flow waits for a time period equal to the temporal threshold and, if it is determined that the manual step has not been completed yet, triggers a machine-learned model to automatically perform the manual step; and
modifying the temporal threshold based on metrics gathered during the execution of the process flow.

Example 9. The method of Example 8, wherein the modifying the temporal threshold includes lowering the temporal threshold to a lowered threshold if at least a predefined percentage of completions of the manual step are performed in a time period equal to the lowered threshold.

Example 10. The method of Examples 8 or 9, wherein the modifying the temporal threshold includes raising the temporal threshold to a higher threshold if at least a predefined percentage of completions of the manual step are not performed in a time period equal to the lowered threshold.

Example 11. The method of any of Examples 8-10, wherein the machine-learned model is trained by passing past execution training data from a target system receiving results of the execution of the process flow into a machine-learning algorithm.

Example 12. The method of Example 11, wherein the machine-learning algorithm performs a weighted sum operation by weights by values for input variables in the past execution training data and compares the result of the weighted sum operation for each piece of past execution training data to a label for the piece of past execution training data.

Example 13. The method of Example 12, wherein the weighted sum is utilized in a loss function that the machine-learning algorithm determines if minimized and, if not, iterates the weighted sum operation using altered weights, until the loss function is minimized.

Example 14. The method of Example 11, wherein the machine-learned model is retrained by passing current execution data from the executing to the machine-learning algorithm.

Example 15. A non-transitory machine-readable medium storing instructions which, when executed by one or more processors, cause the one or more processors to perform operations comprising:
accessing a process flow having a manual step;
accessing a machine-learned model for automatically performing the manual step;
establishing a temporal threshold for the manual step;
executing the process flow using the temporal threshold, such that the execution of the process flow waits for a time period equal to the temporal threshold and, if it is determined that the manual step has not been completed yet, triggers a machine-learned model to automatically perform the manual step; and
modifying the temporal threshold based on metrics gathered during the execution of the process flow.

Example 16. The non-transitory machine-readable medium of Example 15, wherein the modifying the temporal threshold includes lowering the temporal threshold to a lowered threshold if at least a predefined percentage of completions of the manual step are performed in a time period equal to the lowered threshold.

Example 17. The non-transitory machine-readable medium of Examples 15 or 16, wherein the modifying the temporal threshold include raising the temporal threshold to a higher threshold if at least a predefined percentage of completions of the manual step are not performed in a time period equal to the lowered threshold.

Example 18. The non-transitory machine-readable medium of any of Examples 15-17, wherein the machine-learned model is trained by passing past execution training data from a target system receiving results of the execution of the process flow into a machine-learning algorithm.

Example 19. The non-transitory machine-readable medium of Example 18, wherein the machine-learning algorithm performs a weighted sum operation by weights by values for input variables in the past execution training data and compares the result of the weighted sum operation for each piece of past execution training data to a label for the piece of past execution training data.

Example 20. The non-transitory machine-readable medium of Example 19, wherein the weighted sum is utilized in a loss function that the machine-learning algorithm determines if minimized and, if not, iterates the weighted sum operation using altered weights, until the loss function is minimized.

Figure 3:
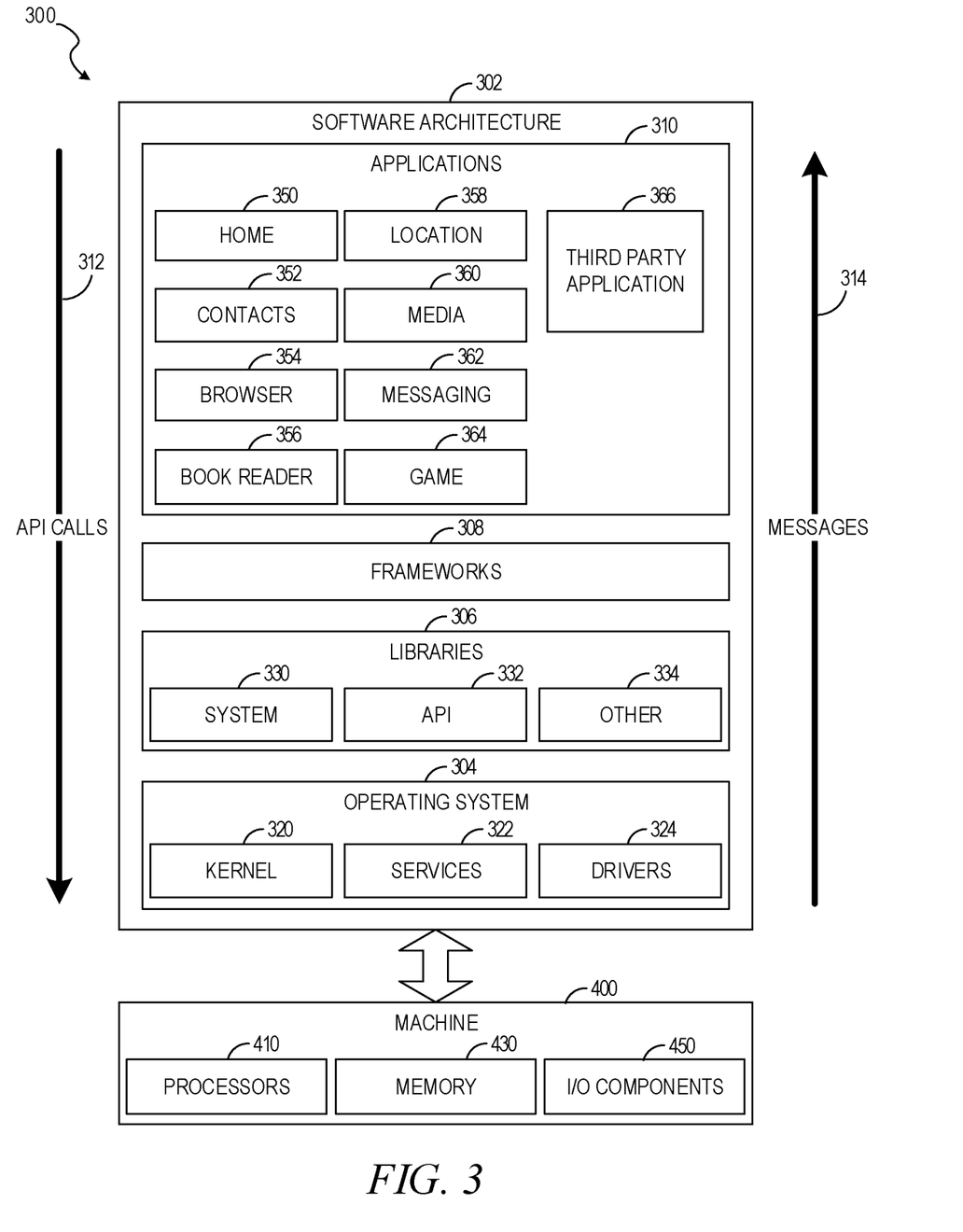
FIG. 3 is a block diagram illustrating an example architecture of software, which can be installed on any one or more of the devices described above.

FIG. 3 is a block diagram 300 illustrating a software architecture 302, which can be installed on any one or more of the devices described above. FIG. 3 is merely a non-limiting example of a software architecture, and it will be appreciated that many other architectures can be implemented to facilitate the functionality described herein. In various embodiments, the software architecture 302 is implemented by hardware such as a machine 400 of FIG. 4 that includes processors 410, memory 430, and input/output (I/O) components 450. In this example architecture, the software architecture 302 can be conceptualized as a stack of layers where each layer may provide a particular functionality. For example, the software architecture 302 includes layers such as an operating system 304, libraries 306, frameworks 308, and applications 310. Operationally, the applications 310 invoke Application Program Interface (API) calls 312 through the software stack and receive messages 314 in response to the API calls 312, consistent with some embodiments.

In various implementations, the operating system 304 manages hardware resources and provides common services. The operating system 304 includes, for example, a kernel 320, services 322, and drivers 324. The kernel 320 acts as an abstraction layer between the hardware and the other software layers, consistent with some embodiments. For example, the kernel 320 provides memory management, processor management (e.g., scheduling), component management, networking, and security settings, among other functionality. The services 322 can provide other common services for the other software layers. The drivers 324 are responsible for controlling or interfacing with the underlying hardware. For instance, the drivers 324 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 306 provide a low-level common infrastructure utilized by the applications 310. The libraries 306 can include system libraries 330 (e.g., C standard library) that can provide functions such as memory allocation functions, string manipulation functions, mathematic functions, and the like. In addition, the libraries 306 can include API libraries 332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 606 can also include a wide variety of other libraries 334 to provide many other APIs to the applications 310.

The frameworks 308 provide a high-level common infrastructure that can be utilized by the applications 310. For example, the frameworks 308 provide various graphical user interface functions, high-level resource management, high-level location services, and so forth. The frameworks 308 can provide a broad spectrum of other APIs that can be utilized by the applications 310, some of which may be specific to a particular operating system 304 or platform.

In an example embodiment, the applications 310 include a home application 350, a contacts application 352, a browser application 354, a book reader application 356, a location application 358, a media application 360, a messaging application 362, a game application 364, and a broad assortment of other applications, such as a third-party application 366. The applications 310 are programs that execute functions defined in the programs. Various programming languages can be employed to create one or more of the applications 310, structured in a variety of manners, such as object-oriented programming languages (e.g., Objective-C, Java, or C++) or procedural programming languages (e.g., C or assembly language). In a specific example, the third-party application 366 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 366 can invoke the API calls 312 provided by the operating system 304 to facilitate functionality described herein.

Figure 4:
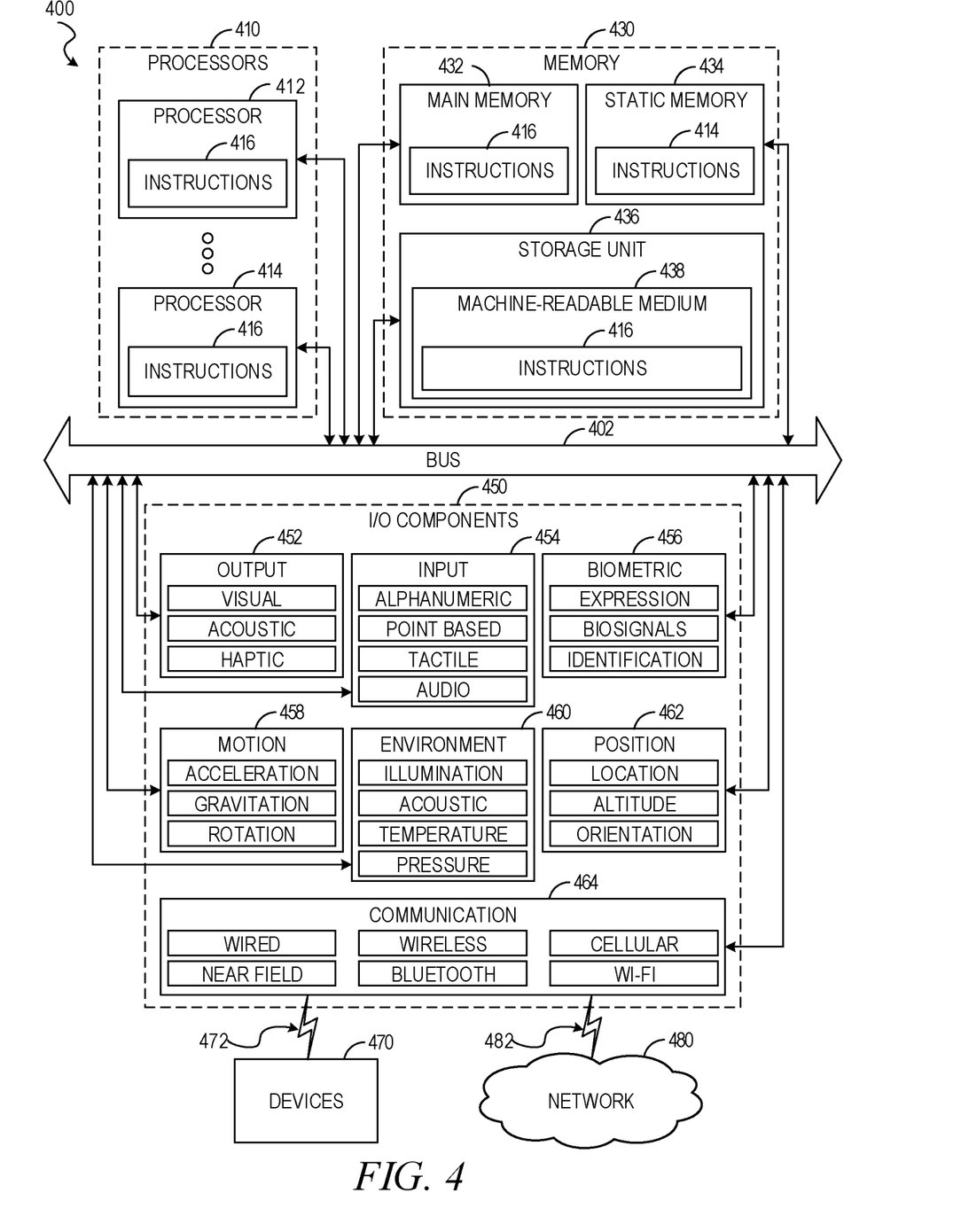
FIG. 4 illustrates a diagrammatic representation of a machine in the form of a computer system within which a set of instructions may be executed for causing the machine to perform any one or more of the methodologies discussed herein.

FIG. 4 illustrates a diagrammatic representation of a machine 400 in the form of a computer system within which a set of instructions may be executed for causing the machine 400 to perform any one or more of the methodologies discussed herein. Specifically, FIG. 4 shows a diagrammatic representation of the machine 400 in the example form of a computer system, within which instructions 416 (e.g., software, a program, an application, an applet, an app, or other executable code) for causing the machine 400 to perform any one or more of the methodologies discussed herein may be executed. For example, the instructions 416 may cause the machine 400 to execute the method of FIG. 2. Additionally, or alternatively, the instructions 416 may implement FIGS. 1-2 and so forth. The instructions 416 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 416, sequentially or otherwise, that specify actions to be taken by the machine 400. Further, while only a single machine 400 is illustrated, the term "machine" shall also be taken to include a collection of machines 400 that individually or jointly execute the instructions 416 to perform any one or more of the methodologies discussed herein.

The machine 400 may include processors 410, memory 430, and I/O components 450, which may be configured to communicate with each other such as via a bus 402. In an example embodiment, the processors 410 (e.g., a CPU, a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 412 and a processor 414 that may execute the instructions 416. The term "processor" is intended to include multi-core processors that may comprise two or more independent processors (sometimes referred to as "cores") that may execute instructions 416 contemporaneously. Although FIG. 4 shows multiple processors 410, the machine 400 may include a single processor 412 with a single core, a single processor 412 with multiple cores (e.g., a multi-core processor 412), multiple processors 412, 414 with a single core, multiple processors 412, 414 with multiple cores, or any combination thereof.

The memory 430 may include a main memory 432, a static memory 434, and a storage unit 436, each accessible to the processors 410 such as via the bus 402. The main memory 432, the static memory 434, and the storage unit 436 store the instructions 416 embodying any one or more of the methodologies or functions described herein. The instructions 416 may also reside, completely or partially, within the main memory 432, within the static memory 434, within the storage unit 436, within at least one of the processors 410 (e.g., within the processor's cache memory), or any suitable combination thereof, during execution thereof by the machine 400.

The I/O components 450 may include a wide variety of components to receive input, provide output, produce output, transmit information, exchange information, capture measurements, and so on. The specific I/O components 450 that are included in a particular machine will depend on the type of machine. For example, portable machines such as mobile phones will likely include a touch input device or other such input mechanisms, while a headless server machine will likely not include such a touch input device. It will be appreciated that the I/O components 450 may include many other components that are not shown in FIG. 4. The I/O components 450 are grouped according to functionality merely for simplifying the following discussion, and the grouping is in no way limiting. In various example embodiments, the I/O components 450 may include output components 452 and input components 454. The output components 452 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 450 may include biometric components 456, motion components 458, environmental components 460, or position components 462, among a wide array of other components. For example, the biometric components 456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 458 may include acceleration sensor components (e.g., accelerometer), gravitation sensor components, rotation sensor components (e.g., gyroscope), and so forth. The environmental components 460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 462 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 450 may include communication components 464 operable to couple the machine 400 to a network 480 or devices 470 via a coupling 482 and a coupling 472, respectively. For example, the communication components 464 may include a network interface component or another suitable device to interface with the network 480. In further examples, the communication components 464 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 470 may be another machine or any of a wide variety of peripheral devices (e.g., coupled via a USB).

Moreover, the communication components 464 may detect identifiers or include components operable to detect identifiers. For example, the communication components 464 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 464, such as location via Internet Protocol (IP) geolocation, location via Wi-Fi® signal triangulation, location via detecting an NFC beacon signal that may indicate a particular location, and so forth.

The various memories (i.e., 430, 432, 434, and/or memory of the processor(s) 410) and/or the storage unit 436 may store one or more sets of instructions 416 and data structures (e.g., software) embodying or utilized by any one or more of the methodologies or functions described herein. These instructions (e.g., the instructions 416), when executed by the processor(s) 410, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media,"

"computer-storage media," and "device-storage media" specifically exclude carrier waves, modulated data signals, and other such media, at least some of which are covered under the term "signal medium" discussed below.

In various example embodiments, one or more portions of the network 480 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 480 or a portion of the network 480 may include a wireless or cellular network, and the coupling 482 may be a Code Division Multiple Access (CDMA) connection, a Global System for Mobile communications (GSM) connection, or another type of cellular or wireless coupling. In this example, the coupling 482 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 416 may be transmitted or received over the network 380 using a transmission medium via a network interface device (e.g., a network interface component included in the communication components 464) and utilizing any one of a number of well-known transfer protocols (e.g., Hypertext Transfer Protocol (HTTP)). Similarly, the instructions 416 may be transmitted or received using a transmission medium via the coupling 472 (e.g., a peer-to-peer coupling) to the devices 470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 416 for execution by the machine 400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   accessing a process flow having a manual step;
   accessing a machine-learned model for automatically performing the manual step;
   establishing a temporal threshold for the manual step;
   executing the process flow using the temporal threshold, such that the execution of the process flow waits for a time period equal to the temporal threshold and, if it is determined that the manual step has not been completed yet, triggers the machine-learned model to automatically perform the manual step; and
   modifying the temporal threshold based on metrics gathered during the execution of the process flow;
   wherein the machine-learned model is trained by passing past execution training data from a target system receiving results of the execution of the process flow into a machine-learning algorithm;
   wherein the machine-learning algorithm performs a weighted sum operation by weights by values for input variables in the past execution training data and compares the result of the weighted sum operation for each piece of past execution training data to a label for the piece of past execution training data.

2. The system of claim 1, wherein the modifying the temporal threshold includes lowering the temporal threshold to a lowered threshold if at least a predefined percentage of completions of the manual step are performed in a time period equal to the lowered threshold.

3. The system of claim 1, wherein the modifying the temporal threshold includes raising the temporal threshold to a higher threshold if at least a predefined percentage of completions of the manual step are not performed in a time period equal to the raised threshold.

4. The system of claim 1, wherein the weighted sum is utilized in a loss function that the machine-learning algorithm determines if minimized and, if not, iterates the weighted sum operation using altered weights, until the loss function is minimized.

5. The system of claim 1, wherein the machine-learned model is retrained by passing current execution data from the executing to the machine-learning algorithm.

6. A method comprising:
   accessing a process flow having a manual step;
   accessing a machine-learned model for automatically performing the manual step;
   establishing a temporal threshold for the manual step;
   executing the process flow using the temporal threshold, such that the execution of the process flow waits for a time period equal to the temporal threshold and, if it is determined that the manual step has not been completed yet, triggers the machine-learned model to automatically perform the manual step; and
   modifying the temporal threshold based on metrics gathered during the execution of the process flow;
   wherein the machine-learned model is trained by passing past execution training data from a target system receiving results of the execution of the process flow into a machine-learning algorithm;
   wherein the machine-learning algorithm performs a weighted sum operation by weights by values for input variables in the past execution training data and compares the result of the weighted sum operation for each piece of past execution training data to a label for the piece of past execution training data.

7. The method of claim 6, wherein the modifying the temporal threshold includes lowering the temporal threshold to a lowered threshold if at least a predefined percentage of completions of the manual step are performed in a time period equal to the lowered threshold.

8. The method of claim 6, wherein the modifying the temporal threshold includes raising the temporal threshold to a higher threshold if at least a predefined percentage of completions of the manual step are not performed in a time period equal to the raised threshold.

9. The method of claim 6, wherein the weighted sum is utilized in a loss function that the machine-learning algorithm determines if minimized and, if not, iterates the weighted sum operation using altered weights, until the loss function is minimized.

10. The method of claim 6, wherein the machine-learned model is retrained by passing current execution data from the executing to the machine-learning algorithm.

11. A non-transitory machine-readable medium storing instructions which, when executed by one or more processors, cause the one or more processors to perform operations comprising:
   accessing a process flow having a manual step;
   accessing a machine-learned model for automatically performing the manual step;
   establishing a temporal threshold for the manual step;
   executing the process flow using the temporal threshold, such that the execution of the process flow waits for a time period equal to the temporal threshold and, if it is determined that the manual step has not been completed yet, triggers the machine-learned model to automatically perform the manual step; and
   modifying the temporal threshold based on metrics gathered during the execution of the process flow;
   wherein the machine-learned model is trained by passing past execution training data from a target system receiving results of the execution of the process flow into a machine-learning algorithm;
   wherein the machine-learning algorithm performs a weighted sum operation by weights by values for input variables in the past execution training data and compares the result of the weighted sum operation for each piece of past execution training data to a label for the piece of past execution training data.

12. The non-transitory machine-readable medium of claim 11, wherein the modifying the temporal threshold includes lowering the temporal threshold to a lowered threshold if at least a predefined percentage of completions of the manual step are performed in a time period equal to the lowered threshold.

13. The non-transitory machine-readable medium of claim 11, wherein the modifying the temporal threshold includes raising the temporal threshold to a higher threshold if at least a predefined percentage of completions of the manual step are not performed in a time period equal to the raised threshold.

14. The non-transitory machine-readable medium of claim 11, wherein the weighted sum is utilized in a loss function that the machine-learning algorithm determines if minimized and, if not, iterates the weighted sum operation using altered weights, until the loss function is minimized.

* * * * *